US011233900B1

(12) United States Patent
Zaki et al.

(10) Patent No.: US 11,233,900 B1
(45) Date of Patent: Jan. 25, 2022

(54) SYSTEMS AND METHODS FOR TELEPHONE CALL REGULATION BASED ON SPAM FACTOR AND USER INPUT

(71) Applicant: Capital One Services, LLC, McLean, VA (US)

(72) Inventors: Zainab Zaki, Reston, VA (US); Manuel Vincente Vivo, McLean, VA (US)

(73) Assignee: CAPITAL ONE SERVICES, LLC, Mclean, VA (US)

( * ) Notice: Subject to any disclaimer, the term of this patent is extended or adjusted under 35 U.S.C. 154(b) by 0 days.

(21) Appl. No.: 16/990,665

(22) Filed: Aug. 11, 2020

(51) Int. Cl.
H04M 3/436 (2006.01)
H04M 3/42 (2006.01)

(52) U.S. Cl.
CPC ....... H04M 3/436 (2013.01); H04M 3/42059 (2013.01)

(58) Field of Classification Search
CPC .......................... H04M 3/436; H04M 3/42059
USPC ............ 379/210.02, 201.01, 207.02, 210.03, 379/211.01, 207.15, 188, 189, 200
See application file for complete search history.

(56) References Cited

U.S. PATENT DOCUMENTS

| 7,577,239 B1 | 8/2009 | Shim et al. |
| 7,613,286 B2 | 11/2009 | Hong |
| 8,326,334 B2 | 12/2012 | Kim et al. |
| 8,681,955 B1 * | 3/2014 | Koster ................. H04M 15/10 379/112.01 |
| 9,450,781 B2 | 9/2016 | Cai et al. |
| 2006/0135132 A1 | 6/2006 | Cai et al. |
| 2006/0168009 A1 | 7/2006 | Lyle et al. |
| 2006/0168030 A1 | 7/2006 | Cai et al. |
| 2006/0168035 A1 | 7/2006 | Cai et al. |
| 2007/0039040 A1 | 2/2007 | McRae et al. |
| 2008/0016159 A1 | 1/2008 | Cai |
| 2008/0084975 A1 * | 4/2008 | Schwartz ............. H04M 3/436 379/88.22 |
| 2008/0123823 A1 | 5/2008 | Pirzada et al. |
| 2010/0094943 A1 | 4/2010 | Leuca |

(Continued)

FOREIGN PATENT DOCUMENTS

| WO | 2007022062 A9 | 2/2007 |
| WO | 2009005253 A1 | 1/2009 |
| WO | 2008052317 A1 | 5/2018 |

Primary Examiner — Thjuan K Addy
(74) Attorney, Agent, or Firm — Hunton Andrews Kurth LLP

(57) ABSTRACT

Systems and methods for telephone call regulation include the use of a predictive model. An example method includes receiving, by a predictive model, a telephone number from a user application comprising instructions for execution on a user device and determining, by the predictive model, a spam factor for the received telephone number. The example method further includes determining, by the predictive model, a classification of the received telephone number based on the spam factor and transmitting, by the predictive model, the classification of the received telephone number to the user application. The example method further includes receiving, by the predictive model, a feedback from the user application, the feedback indicative of a corrective classification of the received telephone number and modifying, by the predictive model, the spam factor for the received telephone number based on the corrective classification.

20 Claims, 10 Drawing Sheets

(56) References Cited

U.S. PATENT DOCUMENTS

| | | |
|---|---|---|
| 2011/0211685 A1 | 9/2011 | Liu et al. |
| 2012/0151578 A1 | 6/2012 | Niemela |
| 2012/0324019 A1 | 12/2012 | Ordogh |
| 2015/0019664 A1 | 1/2015 | Lu et al. |
| 2015/0067842 A1 | 3/2015 | Stibel |

* cited by examiner

SYSTEMS AND METHODS FOR TELEPHONE CALL REGULATION BASED ON SPAM FACTOR AND USER INPUT

FIELD OF THE INVENTION

The present disclosure relates to telecommunication technology, and more particularly, to systems and methods for telephone call regulation based on spam factor and user input.

BACKGROUND

Unwanted telephone calls placed for advertisement, solicitation of information, or other purposes are known as "spam" telephone calls. Spam telephone calls are growing increasingly more deceptive and sophisticated. In some instances, spam calls can be placed for fraudulent purposes, such as phishing calls intended to collect financial or personal information. In other instances, spam calls can be placed once or repeatedly in order to convince individuals to purchase sell products or services, such as calls offering financial products or services to elderly individuals. Spam calls can be made by human operators or by machines, such as automatic dialing machines and robot callers.

Conventional methods and systems for detecting spam telephone calls generally determine a received telephone call as to be spam or legitimate. However, with spam techniques becoming increasingly advanced and complex, conventional methods and systems may no longer work properly or effectively. For example, telephone scammers may use a caller identification spoof strategy (e.g., neighbor spoofing) to get people to answer a telephone call. Neighbor spoofing may employ voice-over-IP (VoIP) services to modify what telephone numbers appear on caller identification, impersonating telephone numbers from local areas to trick a person to answer a spam telephone call. For example, a spam telephone number may be a random number with the same area code and first three digits as a person's own telephone number. In many instances, it can be difficult for a person to identify whether a telephone call is a spam call or a legitimate call from a local caller. Accordingly, conventional methods and systems for spam call management schemes may not work. For example, in a conventional spam call management scheme, a telephone call may be simply identified as a spam call or not, which may cause a legitimate call to be missed or a spam call to be answered.

These and other deficiencies exist. Accordingly, there is a need to provide a telephone user with an appropriate solution that overcomes these deficiencies to facilitate the telephone user to make a proper determination when receiving a telephone call.

SUMMARY

Aspects of the disclosed technology include systems and methods for telephone call regulation based on spam factor and user input. Various embodiments of systems and methods are provided for implementing and managing determination of a spam telephone call, which may be based on a spam factor determined and modified via machine learning (ML) models and user inputs.

Embodiments of the present disclosure provide a system of telephone call regulation based on spam factor and user input. The system comprises a database containing a plurality of telephone numbers and a plurality of spam factors. Each spam factor is associated with one of the plurality of telephone numbers. The system further comprises a predictive model configured to: receive a telephone number from a user application comprising instructions for execution on a user device; determine a spam factor for the received telephone number; determine a classification of the received telephone number based on the spam factor; transmit the classification of the received telephone number to the user application; receive a feedback from the user application, the feedback indicative of a corrective classification of the received telephone number; and modify the spam factor associated with the received telephone number based on the corrective classification. Upon determining the spam factor for the received telephone number, the predictive model is further configured to: search for the received telephone number in the plurality of telephone numbers in the database, and upon locating the received telephone number in the database, retrieve the spam factor associated with the received telephone number.

Embodiments of the present disclosure provide a method for telephone call regulation based on spam factor and user input. The method comprises: receiving, by a predictive model, a telephone number from a user application comprising instructions for execution on a user device; determining, by the predictive model, a spam factor for the received telephone number; determining, by the predictive model, a classification of the received telephone number based on the spam factor; transmitting, by the predictive model, the classification of the received telephone number to the user application; receiving, by the predictive model, a feedback from the user application, the feedback indicative of a corrective classification of the received telephone number; and modifying, by the predictive model, the spam factor for the received telephone number based on the corrective classification. Upon determining the spam factor for the received telephone number, the method further comprises: searching, by the predictive model, for the received telephone number in a database, wherein the database contains a plurality of telephone numbers and a plurality of spam factors, and each spam factor is associated with one of the plurality of telephone number; and upon locating the received telephone number in the plurality of telephone numbers, retrieving, by the predictive model, the spam factor associated with the received telephone number.

Embodiments of the present disclosure provide a device for telephone call regulation based on spam factor and user input. The device comprises a processor, a display coupled to the processor, and a memory coupled to the processor. The processor is configured to: receive a telephone call number from a call device; forward the telephone call number to a computing server comprising a predictive model; receive a classification of the telephone call number from the computing server; display the classification of the telephone call number on the display; execute an action on the telephone call number based on the classification; receive a survey message from the computing server regarding the telephone call number; display the survey message on the display; provide a response to the survey message; and transmit the response to the computing server.

Further features of the disclosed invention, and the advantages offered thereby, are explained in greater detail hereinafter with reference to specific example embodiments illustrated in the accompanying drawings.

DETAILED DESCRIPTION OF EXAMPLE EMBODIMENTS

Figure 1:
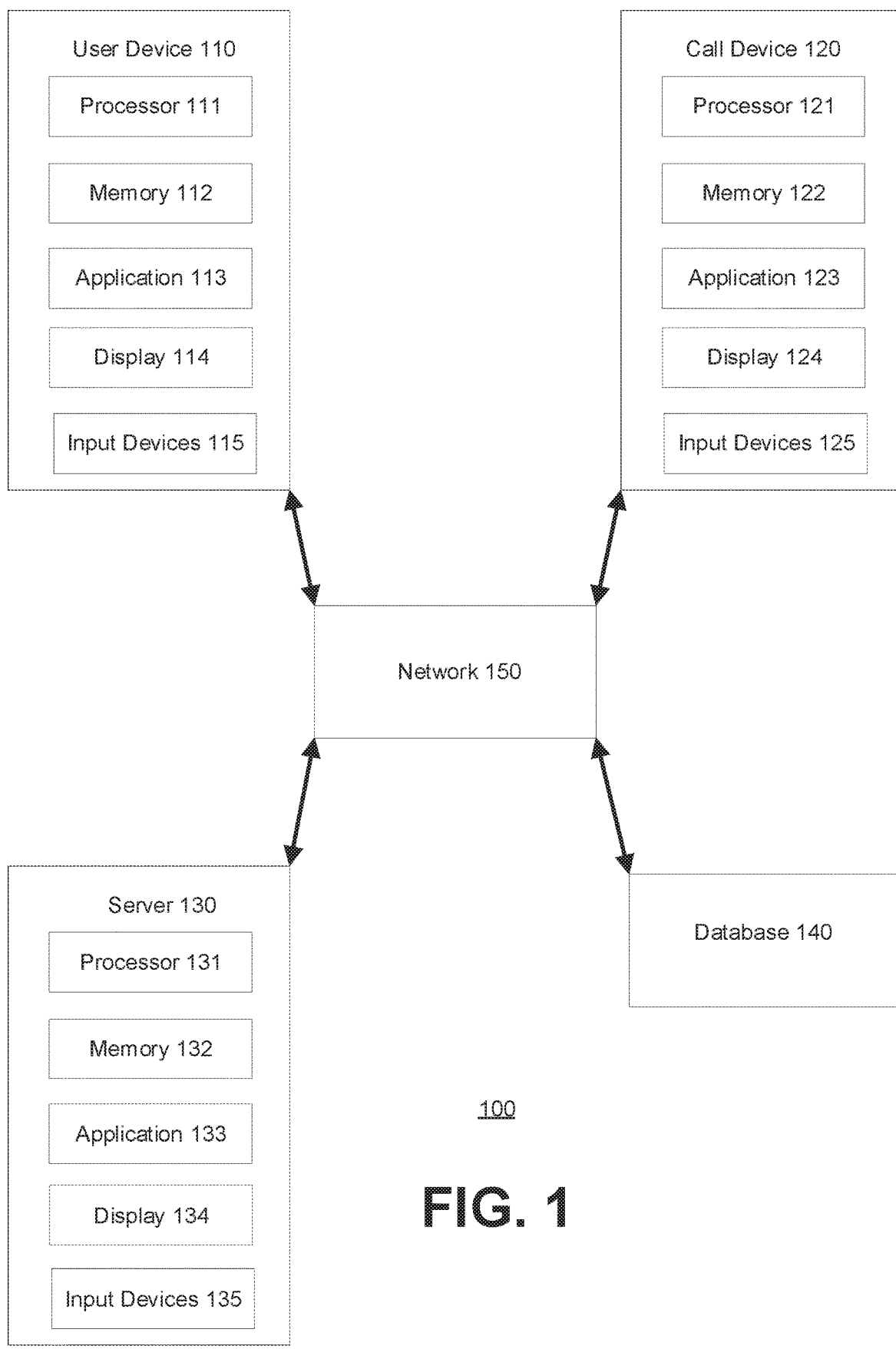
FIG. 1 is a diagram of a telephone call regulation system according to an example embodiment.

The following description of embodiments provides non-limiting representative examples referencing numerals to particularly described features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Example embodiments of the present disclosure provide systems, devices and methods for regulating a telephone call based on a spam factor and user inputs that can effectively and efficiently determine whether the telephone call is a spam telephone call for a user. The spam factor can be dynamically modified and updated via predictive models (e.g., machine learning models) and user inputs or feedbacks, which may significantly enhance the accuracy of predicting whether an incoming telephone call is a spam call. This can ensure that a legitimate call will not be missed and a spam call will not to be answered. By doing so, user annoyance and time spent answering spam calls can be reduced. In addition, by avoiding unwanted calls that can be potentially phishing calls or other calls placed for fraudulent or misleading purposes, user privacy and security can be increased.

Example embodiments of the present disclosure can differ from the conventional approaches in which a telephone number is simply classified as spam or not. For example, in the conventional approach, if the telephone number is classified as a spam call, then it is simply blocked. Example embodiments provide, however, that a telephone number is assigned a spam factor. There may have different categories for ranges of the spam factor, e.g. definitely spam, likely spam, likely not spam, and verified phone number. Depending on the categories, a user can take appropriate actions and/or provide feedback to facilitate deciding whether the telephone number is spam or not. That can increase confidence when notifying the user that a telephone number is spam.

Specifically, in some example embodiments of the present disclosure, when a telephone call is received by a user, a database of telephone numbers is checked to determine if the telephone call number is spam or not based on a spam factor associated with the telephone call number. In addition, the user has an opportunity to indicate if the telephone call number is actually spam or not. This user input can be used to modify the spam factor in a way that any telephone number can be spam at certain point in time and not a spam telephone number in the future.

For example, if the telephone number is definitely spam based on the spam factor, the telephone call is blocked and a push notification is sent to the user saying the telephone call is blocked. For this scenario, if the telephone number turns out not to be spam (verified by the user), the user could go in the application and system, browse to this blocked call and notify the database that the telephone number is not spam. As another example, if the telephone number is likely to be spam based on the spam factor, the telephone call is allowed to be ringing but the user is notified (e.g., via text on the user's telephone screen) that the telephone call is likely to be spam. If the user answers the telephone call, the user will have the opportunity to tell the database if the telephone call is actually spam or not. An interactive message is used to get the user's feedback. Based on the user's input, the spam factor can be modified for that particular telephone number. As a further example, if the telephone number is verified by the database not to be spam based on the spam factor, the user is notified that it is a legitimate telephone call and the name of the caller may be displayed on the user's telephone screen. Therefore, a telephone call may be classified into categories (e.g., definitely spam, likely spam, likely not spam, verified phone number) based on the spam factor instead of simply "spam" and "not spam". The user's input or feedback may be used to modify the spam factor to further tune the spam factor for more accurately classifying the telephone number.

As used herein, the spam factor may be a factor reflecting how likely a telephone number is a spam phone number. The spam factor can take various forms, including, but not limited to, a quantitative form or a qualitative form. The quantitative form may include a 0-1 scale, a 1-10 scale, a 1-100 scale and the like with a smaller number indicative of a lower probability of a telephone number being a spam phone number and a larger number indicative of a higher probability of a telephone number being a spam phone number. For example, a spam factor of 0.1 on a 0-1 scale may indicate that a telephone number having the spam factor of 0.1 has a lower probability of being a spam phone number; and accordingly a spam factor of 0.9 on a 0-1 scale may indicate that a telephone number having the spam factor of 0.9 has a higher probability of being a spam phone number. The qualitative form may be in the form of a monochromatic color scheme or a multicolor scheme. In an example of the monochromatic scheme, variations of one color may be indicative of different spam factors. For example, a light red color in a monochromatic red color scheme may indicate a lower probability of a telephone number being a spam phone number; and a dark red color in the monochromatic red color scheme may indicate a higher probability of a telephone number being a spam phone number. In an example of the multicolor scheme, different colors may be indicative of different spam factors. For example, a green color in a multicolor scheme may indicate a lower probability of a telephone number being a spam phone number; a yellow color in the multicolor scheme may indicate a median probability of a telephone number being a spam phone number; and a red color in the multicolor scheme may indicate a higher probability of a telephone number being a spam phone number. The qualitative form may also take other forms, such as an audio scheme form. In an example of the audio scheme form, a lower audio volume may indicate a lower probability of a telephone number being a spam phone number, and a louder audio volume may indicate a higher probability of a telephone number being a spam phone number. Of course, the quantitative form and the qualitative form can work the other way around. For example, on a 0-1 scale, a smaller number can be indicative of a higher probability of a telephone number being a spam phone number and a larger number can be indicative of a lower probability of a telephone number being a spam phone number.

In some embodiments, determination of the spam factor may also take into account other factors in addition to the user inputs. In an embodiment, the other factors may include a user's profile of a user associated with a user device that receives a telephone call. For example, the user may be associated with a doctor's office (e.g., the user's family doctor works in the doctor's office), and a telephone call to the user's device from the doctor's office can be a legitimate call for that user. However, the telephone call from the doctor's office may be a spam phone call for another user who is not associated with the doctor office. In another example, a user may prefer text messages over phone calls. Thus, a text message to that user from a telephone number may be legitimate for that user, and a phone call to that user from that same telephone number may be spam for that user. In such scenarios, the spam factor may be dynamically changed and personalized.

FIG. 1 illustrates a telephone call regulation system 100 according to an example embodiment. As further discussed below, the system 100 may include a user device 110, a call device 120, a server 130, and a database 140 in communication via a network 150. Although FIG. 1 illustrates single instances of the components, the system 100 may include any number of components.

In some examples, the user device 110 can be associated with a user and may be operated by that user. The user may operate the user device 110 to make or receive a telephone call, and to interact with the server 130. For example, the user device 110 may receive a telephone call from the call device 120 and forward the telephone call to the server 130. The user device 110 may be operated by the user to provide feedbacks or inputs to the server 130.

In some embodiments, the call device 120 can be associated with a telephone calling entity, such as a human being or a call robot, and may be operated by the entity. For example, the call device 120 may be operated by the entity to make a telephone call to the user device 110. The telephone call may be a call made by a human operator or an automatic call made by a robot (e.g., a robocall that uses a computerized autodialer to deliver a pre-recorded message).

In some embodiments, the server 130 may be configured to receive a telephone call forwarded from the user device 110 and to communicate with the database 140 to fetch a spam factor associated with the telephone call. The server 130 may further be configured to push a notification to the user device 110 and request a response to the notification from the user device 110.

The user device 110 may be a network-enabled computer device that is capable of being configured to make and receive telephone calls. Exemplary network-enabled computer devices may include, without limitation, a server, a network appliance, a personal computer, a laptop computer, a tablet computer, a workstation, a phone, a handheld personal computer, a personal digital assistant, a thin client, a fat client, an Internet browser, a mobile device, a kiosk, or other computer devices or communications devices. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The user device 110 may include a processor 111, a memory 112, an application 113, a display 114 and input devices 115. The processor 111 may be a processor, a microprocessor, or other processor, and the user device 110 may include one or more of these processors. The processor 111 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 111 may be coupled to the memory 112. The memory 112 may be a read-only memory, write-once read-multiple memory or read/write memory, e.g., RAM, ROM, and EEPROM, and the user device 110 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 112 may be configured to store one or more software applications, such as the application 113, and other data, such as private information and telephone numbers.

The application 113 may comprise one or more software applications comprising instructions for execution on the user device 110. In some examples, the user device 110 may execute one or more applications, such as software applications, that enable, for example, network communications with one or more components of the system 100, transmit and/or receive data, and perform the functions described herein. Upon execution by the processor 111, the application 113 may provide the functions described in this specification, specifically to execute and perform the steps and functions in the process flows described above. Such processes may be implemented in software, such as software modules, for execution by computers or other machines. The application 113 may provide graphic user interfaces (GUIs) through which a user may view and interact with other components and devices within the system 100. The GUIs may be formatted, for example, as web pages in HyperText Markup Language (HTML) or Extensible Markup Language (XML), a dialog box, a messaging platform or in any other suitable form for presentation on the display 114 depending upon applications used by users to interact with the system 100.

The user device 110 may further include the display 114 and input devices 115. The display 114 may be any type of device for presenting visual information such as a computer monitor, a flat panel display, and a mobile device screen, including liquid crystal displays, light-emitting diode displays, plasma panels, and cathode ray tube displays. The input devices 115 may include any device for entering information into the user device 110 that is available and supported by the user device 110, such as a touch-screen, keyboard, mouse, cursor-control device, microphone, digital camera, video recorder or camcorder. These devices may be used to enter information and interact with the software and other devices described herein.

The call device 120 may be a network-enabled computer device that is capable of being configured to make and receive telephone calls. Exemplary network-enabled computer devices may include, without limitation, a server, a network appliance, a personal computer, a laptop computer, a tablet computer, a workstation, a phone, a handheld personal computer, a personal digital assistant, a thin client, a fat client, an Internet browser, a mobile device, a kiosk, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The call device 120 may include a processor 121, a memory 122, and an application 123. The processor 121 may be a processor, a microprocessor, or other processor, and the call device 120 may include one or more of these processors. The processor 121 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 121 may be coupled to the memory 122. The memory 122 may be a read-only memory, write-once read-multiple memory or read/write memory, e.g., RAM, ROM, and EEPROM, and user deice may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 122 may be configured to store one or more software applications, such as application 122, and other data, such as private information and telephone numbers.

The application 123 may comprise one or more software applications comprising instructions for execution on the call device 120. In some examples, the call device 120 may execute one or more applications, such as software applications, that enable, for example, network communications with one or more components of the system 100, transmit and/or receive data, and perform the functions described herein. Upon execution by the processor 121, the application 123 may provide the functions described in this specification, specifically to execute and perform the steps and functions in the process flows described above. Such processes may be implemented in software, such as software modules, for execution by computers or other machines. The application 123 may provide graphic user interfaces (GUIs) through which user may view and interact with other components and devices within the system 100. The GUIs may be formatted, for example, as web pages in HyperText Markup Language (HTML) or Extensible Markup Language (XML), a dialog box, a messaging platform, or in any other suitable form for presentation on a display 124 depending upon applications used by users to interact with the system 100.

The call device 120 may further include the display 124 and input devices 125. The display 124 may be any type of device for presenting visual information such as a computer monitor, a flat panel display, and a mobile device screen, including liquid crystal displays, light-emitting diode displays, plasma panels, and cathode ray tube displays. The input devices 125 may include any device for entering information into the call device 120 that is available and supported by the call device 120, such as a touch-screen, keyboard, mouse, cursor-control device, microphone, digital camera, video recorder or camcorder. These devices may be used to enter information and interact with the software and other devices described herein.

The server 130 may be a network-enabled computer device. Exemplary network-enabled computer devices may include, without limitation, a server computer, a network appliance, a personal computer, a laptop computer, a tablet computer, a workstation, a phone, a handheld personal computer, a personal digital assistant, a thin client, a fat client, an Internet browser, a mobile device, a kiosk, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The server 130 may include a processor 131, a memory 132, and an application 133. The processor 131 may be a processor, a microprocessor, or other processor, and the server 130 may include one or more of these processors. The processor 131 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 131 may be coupled to the memory 132. The memory 132 may be a read-only memory, write-once read-multiple memory or read/write memory, e.g., RAM, ROM, and EEPROM, and user deice may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 132 may be configured to store one or more software applications, such as application 133, and other data, such as private information and telephone numbers.

The application 133 may comprise one or more software applications comprising instructions for execution on the server 130. For example, the application 133 may comprise one or more predictive models such various ML models that are capable of determining spam factors of telephone numbers. In some examples, the server 130 may execute one or more applications, such as software applications, that enable, for example, network communications with one or more components of the system 100, transmit and/or receive data, and perform the functions described herein. Upon execution by the processor 131, the application 133 may provide the functions described in this specification, specifically to execute and perform the steps and functions in the process flows described above. Such processes may be implemented in software, such as software modules, for execution by computers or other machines. The application 133 may provide graphic user interfaces (GUIs) through which user may view and interact with other components and devices within system 100. The GUIs may be formatted, for example, as web pages in HyperText Markup Language (HTML) or Extensible Markup Language (XML), a dialog box, a messaging platform, or in any other suitable form for presentation on a display 134 depending upon applications used by users to interact with the system 100.

The server 130 may further include the display 134 and input devices 135. The display 134 may be any type of device for presenting visual information such as a computer monitor, a flat panel display, and a mobile device screen, including liquid crystal displays, light-emitting diode displays, plasma panels, and cathode ray tube displays. The input devices 135 may include any device for entering information into the server 130 that is available and supported by the server 130, such as a touch-screen, keyboard, mouse, cursor-control device, microphone, digital camera, video recorder or camcorder. These devices may be used to enter information and interact with the software and other devices described herein.

The database 140 may be one or more databases configured to store data, including without limitation, private information, telephone numbers, and spam factors. The database 140 may comprise a relational database, a non-relational database, or other database implementations, and any combination thereof, including a plurality of relational databases and non-relational databases. In some examples, the database 140 may comprise a desktop database, a mobile database, or an in-memory database. Further, the database 140 may be hosted internally by the server 130 or may be hosted externally of the server 130, such as by a server device, by a cloud-based platform, or in any storage device that is in data communication with the server 130.

The system 100 may include one or more networks 150. In some examples, the network 150 may be one or more of a wireless network, a wired network or any combination of wireless network and wired network, and may be configured to connect the user device 110 to the call device 120, the user device 110 to the server 130, the server 130 to the database 140, and the call device 120 to the server 130. For example, the network 150 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, the network 150 may include, without limitation, telephone lines, fiber optics, IEEE Ethernet 902.3, a wide area network, a wireless personal area network, a LAN, or a global network such as the Internet. In addition, the network 150 may support an Internet network, a wireless communication network, a cellular network, or the like, or any combination thereof. The network 150 may further include one network, or any number of the exemplary types of networks mentioned above, operating as a stand-alone network or in cooperation with each other. The network 150 may utilize one or more protocols of one or more network elements to which they are communicatively coupled. The network 150 may translate to or from other protocols to one or more protocols of network devices. Although the network 150 is depicted as a single network, it should be appreciated that according to one or more examples, the network 150 may comprise a plurality of interconnected networks, such as, for example, the Internet, a service provider's network, a cable television network, corporate networks, such as credit card association networks, and home networks. The network 150 may further comprise, or be configured to create, one or more front channels, which may be publicly accessible and through which communications may be observable, and one or more secured back channels, which may not be publicly accessible and through which communications may not be observable.

In some examples, communications between the user device 110, the call device 120, and the server 130 via the network 150 can occur via one or more front channels and one or more secure back channels. A front channel may be a communication protocol that employs a publicly accessible and/or unsecured communication channel such that a communication sent to the user device 110, call device 120, and/or server 130 may originate from any other device, whether known or unknown to the user device 110, call device 120, and/or server 140, if that device possesses the address (e.g., network address, Internet Protocol (IP) address) of the user device 110, call device 120, and/or server 130. Exemplary front channels include, without limitation, the Internet, an open network, and other publicly-accessible communication networks. In some examples, communications sent via a front channel may be subject to unauthorized observation by another device. In some examples, front channel communications may comprise Hypertext Transfer Protocol (HTTP) secure socket layer (SSL) communications, HTTP Secure (HTTPS) communications, and browser-based communications with a server or other device.

A secure back channel may be a communication protocol that employs a secured and/or publicly inaccessible communication channel. A secure back channel communication sent to the user device 110, call device 120, and/or server 130 may not originate from any device, and instead may only originate from a selective number of parties. In some examples, the selective number of devices may comprise known, trusted, or otherwise previously authorized devices. Exemplary secure back channels include, without limitation, a closed network, a private network, a virtual private network, an offline private network, and other private communication networks. In some examples, communications sent via a secure back channel may not be subject to unauthorized observation by another device. In some examples, secure back channel communications may comprise Hypertext Transfer Protocol (HTTP) secure socket layer (SSL) communications, HTTP Secure (HTTPS) communications, and browser-based communications with a server or other device.

Figure 2:
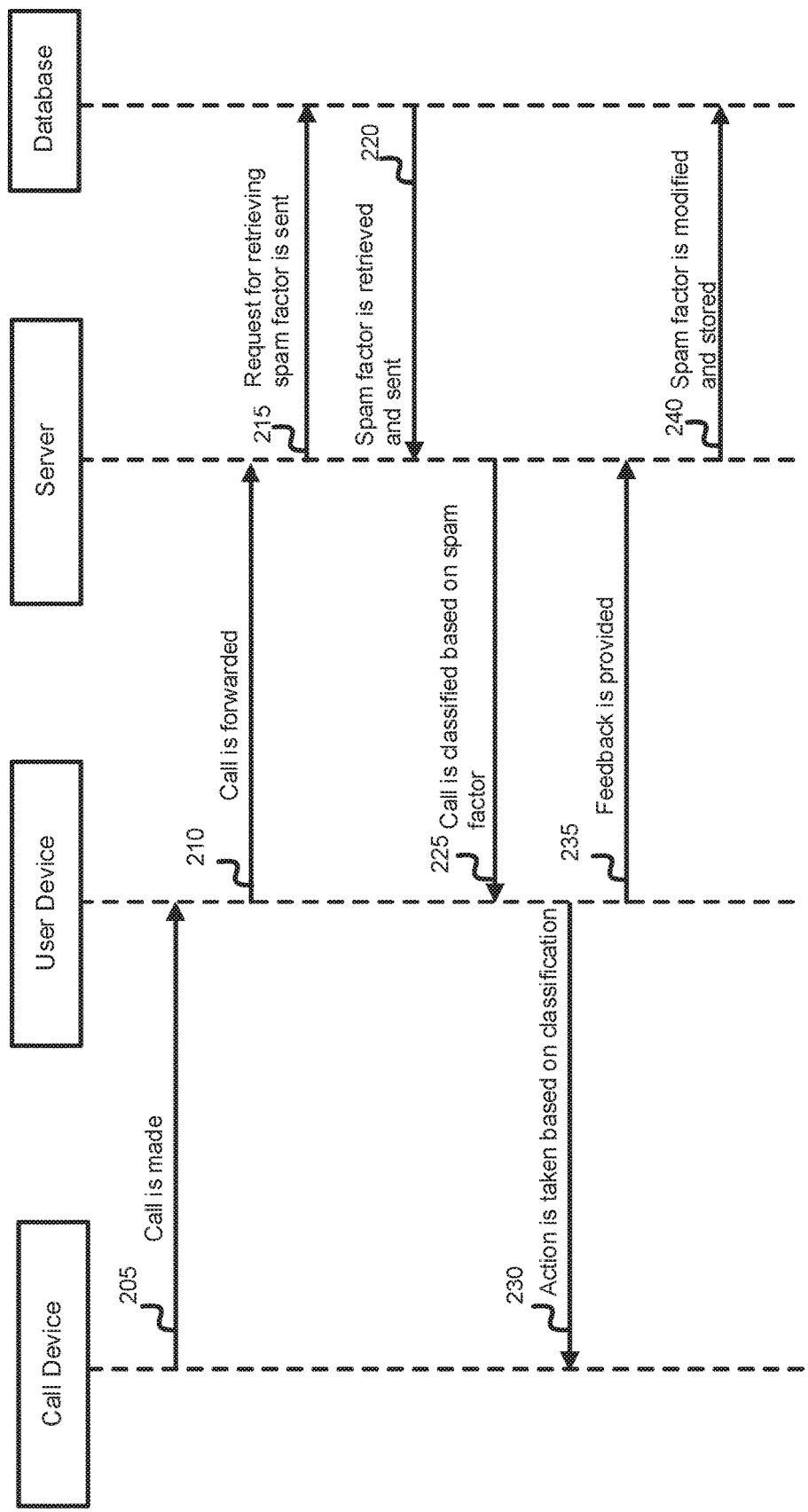
FIG. 2 is a sequence diagram for regulating a telephone call according to an example embodiment.

FIG. 2 illustrates a sequence diagram for a method 200 of regulating a telephone call according to an example embodiment. FIG. 2 may reference the same or similar components as those illustrated in FIG. 1, including a user device, a call device, a server and a database.

The method 200 may commence at step 205, where a call device (e.g., the call device 120 in FIG. 1) makes a telephone call via a network (e.g., the network 150 in FIG. 1) to a user device (e.g., the user device 110 in FIG. 1). The telephone call may be made by a real person or a robot via the call device. In some embodiments, the call device may be configured via hardware, software or combination thereof to employ caller ID spoof techniques such that the area code and other digits of the telephone call number is the same as those of a telephone number associated with the user device (e.g., a telephone number assigned to a SIM card of the user device, a telephone number stored in a memory of the user device, or a telephone number associated with the user device by the network). In an example, the telephone number can also appear to be from a local business or person, which is similar to a telephone number assigned to the user device (e.g., same area code and the first three digits).

In step 210, the telephone call made to the user device may be forwarded by the user device to a server (e.g., the server 130 in FIG. 1). Upon receiving the telephone call by the user device, the user device may automatically forward the telephone call and/or the telephone call number via a back channel to the server prior to any action taken on the telephone call by the user of the user device. In an example, the caller identification and other information associated with the telephone call may not be present on a display (e.g., the display 114) of the user device. In another example, the caller identification and other information associated with the telephone call may appear on the display of the user device. In an example, the telephone call may be forwarded by the user device to the server via a network such as the network 150 in FIG. 1.

In step 215, the server may send a request of retrieving a spam factor associated with the telephone call to a database (e.g., the database 140 in FIG. 1). The request may be communicated from the server to the database via a network (e.g., the network 150 in FIG. 1). Upon receiving the forwarded telephone call from the user device, the server may request to retrieve a spam factor for the telephone call, for example, by searching the database using the telephone number. The database may store a plurality of phone numbers and a plurality of spam factors, and each spam factor is associated with one corresponding phone number.

In order to determine the spam factor of the telephone call, the plurality of phone numbers in the database may be searched for the telephone call. Upon locating the telephone call in the plurality of phone numbers, a spam factor of the telephone call can be retrieved from the plurality of spam factors. In step 220, the retrieved spam factor can be communicated via the network back to the server.

In some embodiments, after searching the plurality of phone numbers in the database for the telephone call, the telephone call is unable to be located in the database. For example, the telephone call number may be a new phone number to the database. In another example, the telephone call number may have been stored in the database but was removed later from the database. In such a case, a new spam factor of the telephone call may be determined by the server, for example by calculating the new spam factor based on features of the telephone call. The telephone call features may comprise, but not limited to, an area code of the telephone call, a time at which the telephone call is received by the user device, a date on which the telephone call is received by the user device, whether the telephone call is a private number, whether the telephone call is a toll free number, the similarity between the telephone call number and one or more phone numbers stored in the database (e.g., same area code and same first three digits), etc. In some embodiments, a predictive model may be used to calculate or predict the new spam factor. Once the new spam factor is determined for the telephone call, the telephone call and its new spam factor may be communicated from the server to the database and stored in the database. For example, a new data entry is created in the database to associate the telephone call with the new spam factor.

In some examples, in step 220, the spam factor retrieved from the database may be further tuned by the server to obtain a renewed spam factor. For example, the retrieved spam factor may be modified in part based on one or more of the telephone call features described above to achieve the renewed spam factor. The modification of the retrieved spam factor may be performed through a ML model. The renewed spam factor may be transmitted by the server via the network to the database where the renewed spam factor can be stored to replace the retrieved spam factor.

In some examples, in step 225, the telephone call may be classified into different categories based on the spam factor. For example, on a scale of 0 to 1 for spam factor, a spam factor in a range of 0.8-1 can be classified as "a definitely spam phone number", a spam factor in a range of 0.5 to 0.79 can be classified as "a likely spam phone number", a spam factor in a range of 0.2-0.49 can be classified as "probably not a spam phone number", and a spam factor in a range of 0 to 0.19 can be classified as "a verified phone number". In another example, categories may be classified based on the spam factor in a reverse order, that is, on a scale of 0 to 1 for spam factor, a spam factor in a range of 0.8-1 can be classified as "a verified phone number", a spam factor in a range of 0.5 to 0.79 can be classified as "likely not a spam phone number", a spam factor in a range of 0.2-0.49 can be classified as "a likely spam phone number", and a spam factor in a range of 0 to 0.19 can be classified as "a definitely spam phone number". The category classification may be performed by the predictive model.

Figure 3A:
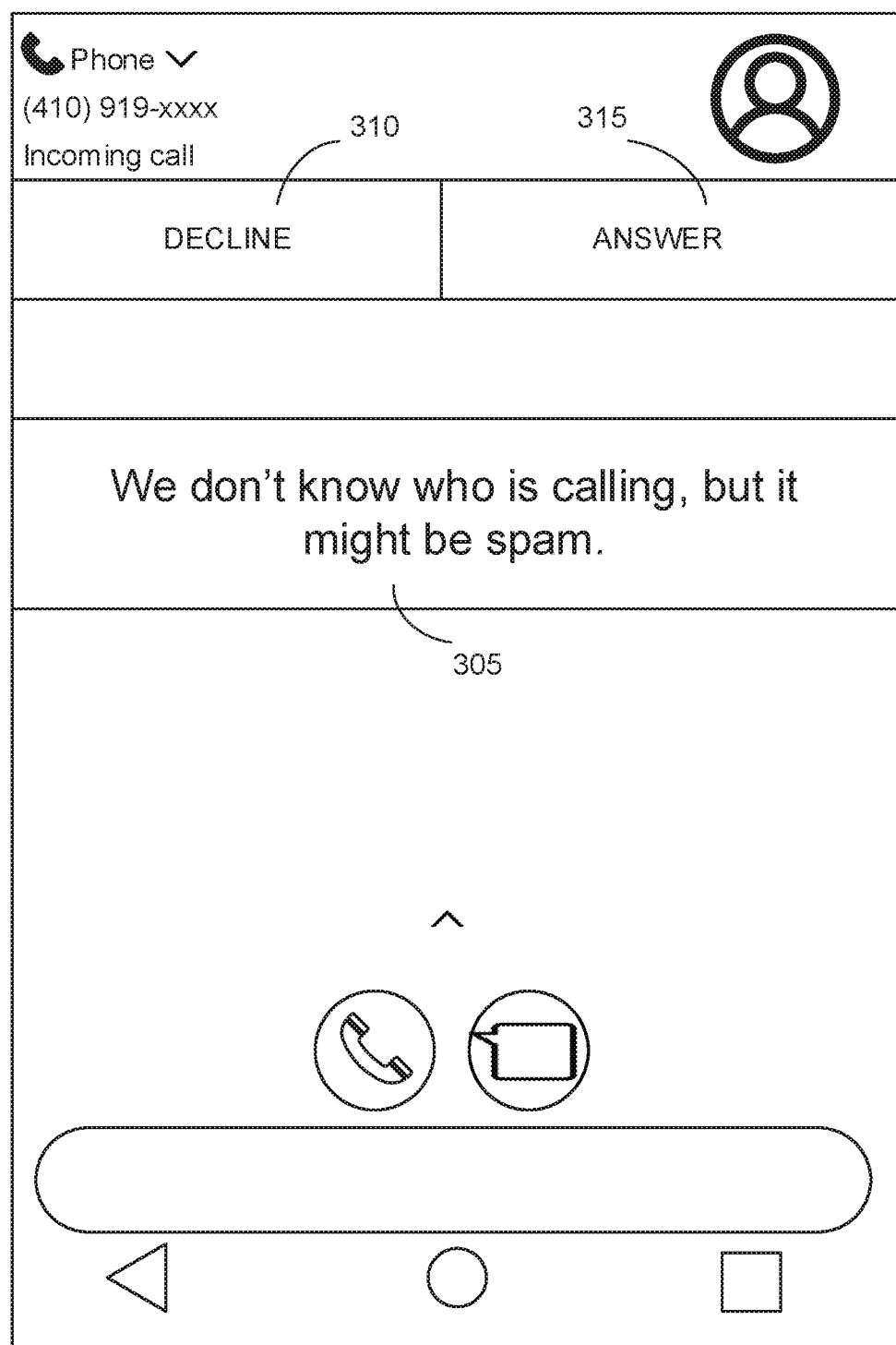
FIGS. 3A-3C are diagrams illustrating various telephone call classifications according to an example embodiment.
Figure 3B:
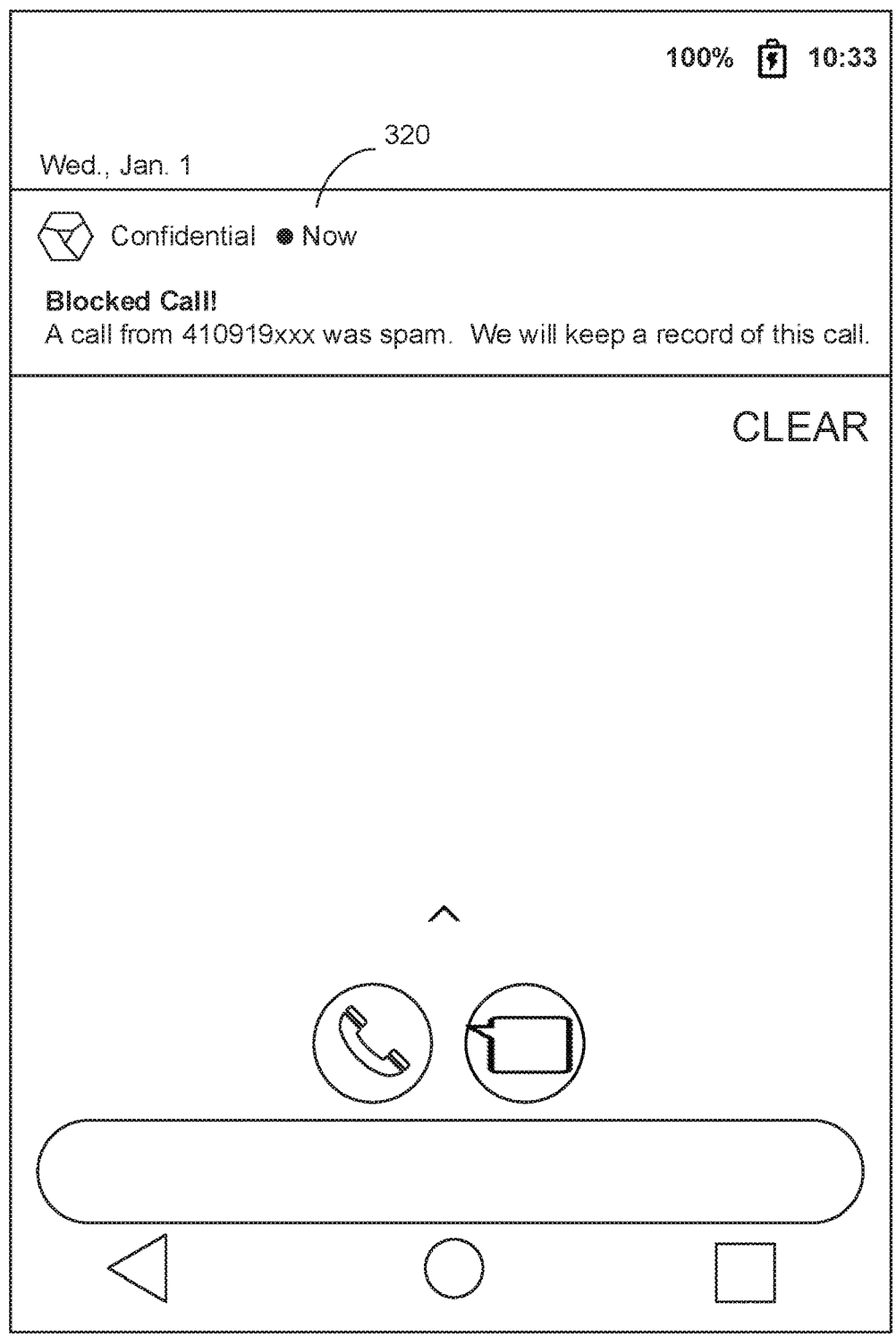
Figure 3C:
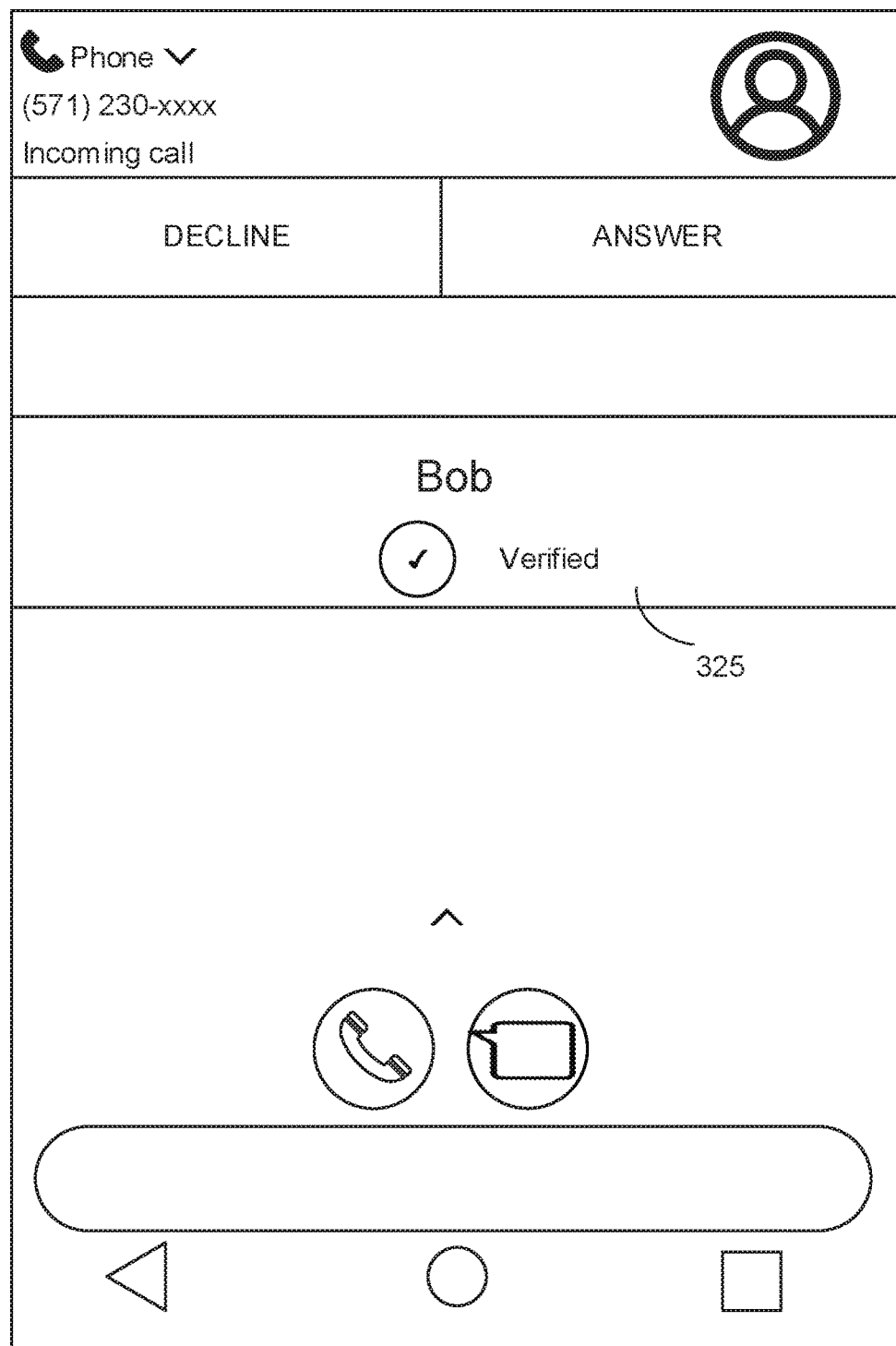

The classification of the telephone call may then be transmitted back via the back channel to the user device. The classification may be transmitted by the server as a push notification to the user device. The classification of the telephone call may be displayed on the display 114 of the user device. The classification may be displayed on the user device as texts, a diagram, a picture, an image, or a combination thereof. For example, an example classification 305 of a telephone call is shown in FIG. 3A where the classification 305 is displayed as texts on the display of the user device. Upon receiving the classification 305, the user may decline (310) or answer (315) the telephone call because the classification 305 indicates that the telephone call might be spam. Another example classification 320 of a telephone call is shown in FIG. 3B where the classification 320 is displayed on the display of the user device as a combination of texts and images. Upon receiving the classification 320, the telephone call may be blocked automatically by the server because the classification 320 indicates that the telephone call is classified by the server as spam. Yet as another example classification, FIG. 3C illustrates a classification 325 displayed on the display of the user device as a combination of texts and a diagram. Upon receiving the classification 325, the telephone call may be answered by the user because the classification 325 indicates that the telephone call is verified to be legitimate by the server.

Referring back to FIG. 2, depending on the classification category, in step 230, the user can take actions in response to the telephone call. The action may be one of the following: answer the telephone call, decline the telephone call, or let the telephone call keep ringing. For example, when the classification indicates that the telephone call might be spam, the user may let the telephone call ring for a period of time or until it stops ringing instead of declining the telephone call manually by pressing a decline button on the user device.

In step 235, the user may provide a feedback or input about the telephone call to the server after the action executed by the user. The predictive model of the server may take this user input to further tune the spam factor associated with this telephone call number, such that a classification of the telephone number can be more accurate and personalized in the future for the user of the user device. In step 240, the modified spam factor based on the user input may be transmitted from the server to the database and stored therein to replace the previous spam factor associated with the telephone call number.

The feedback or input can comprise, but not limited to, information indicative of whether the telephone call is actually spam, information indicative of the user being in the middle of something, information indicative of the user's preferences (e.g., the telephone call is definitely spam after 10:00 PM for the user, the telephone number is definitely legitimate for the user between 8:00 AM and 5:00 PM, and the telephone number might be spam or legitimate for the user between 5:00 PM and 10:00 PM depending on the actual situations the user is in), and so forth.

Figure 4:
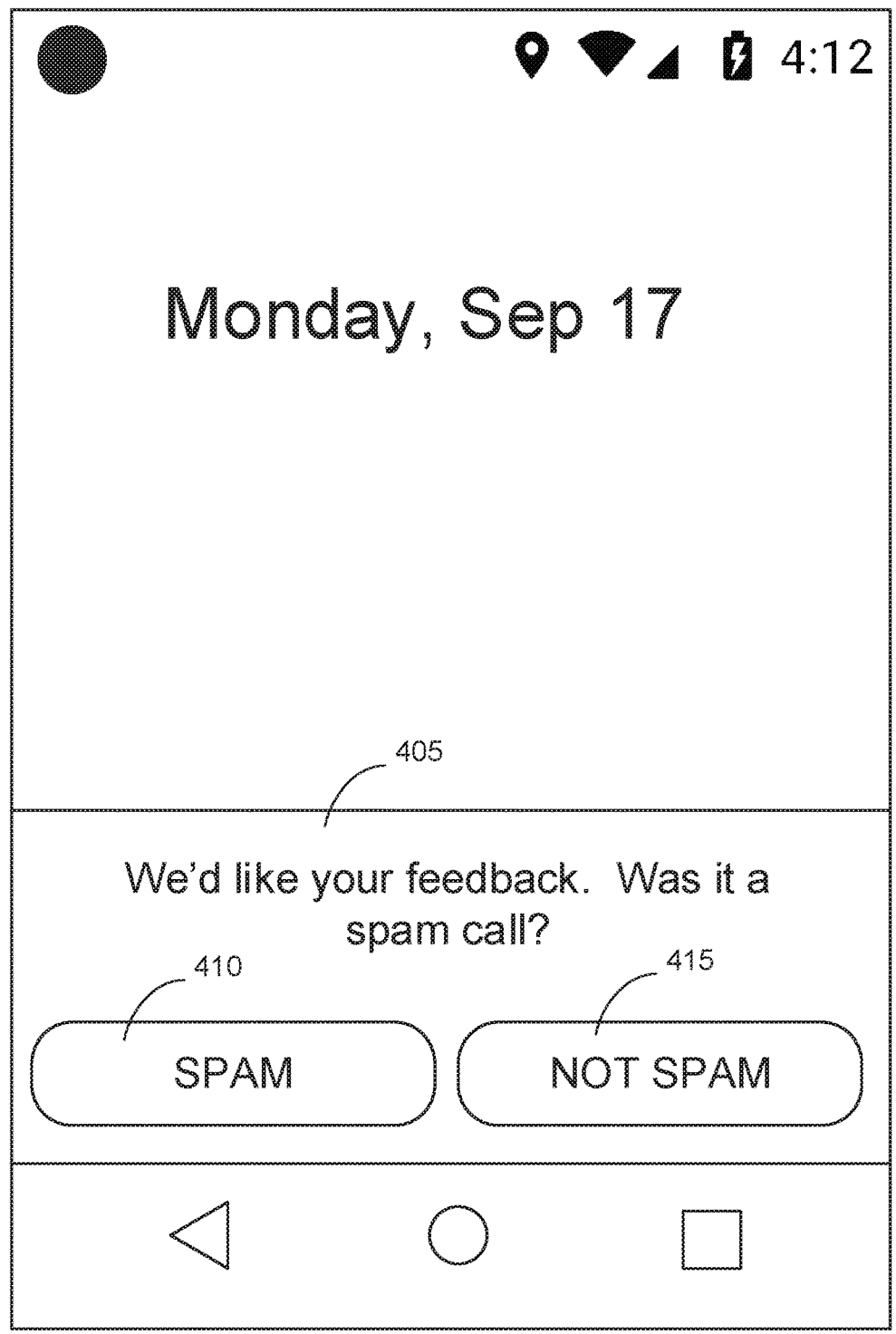
FIG. 4 is a diagram illustrating a user input interface according to an example embodiment.

An example user input interface is illustrated in FIG. 4. After the action executed by the user, a push notification configured as a survey message may be generated and transmitted by the server to the user device. The push notification may be received by the application 113 of the user device and displayed on the display 114 of the user device as a message box 405. The user may select one of the two options 410 (SPAM) and 415 (NOT SPAM), and the application 113 can send the user's selection to the server.

Figure 5:
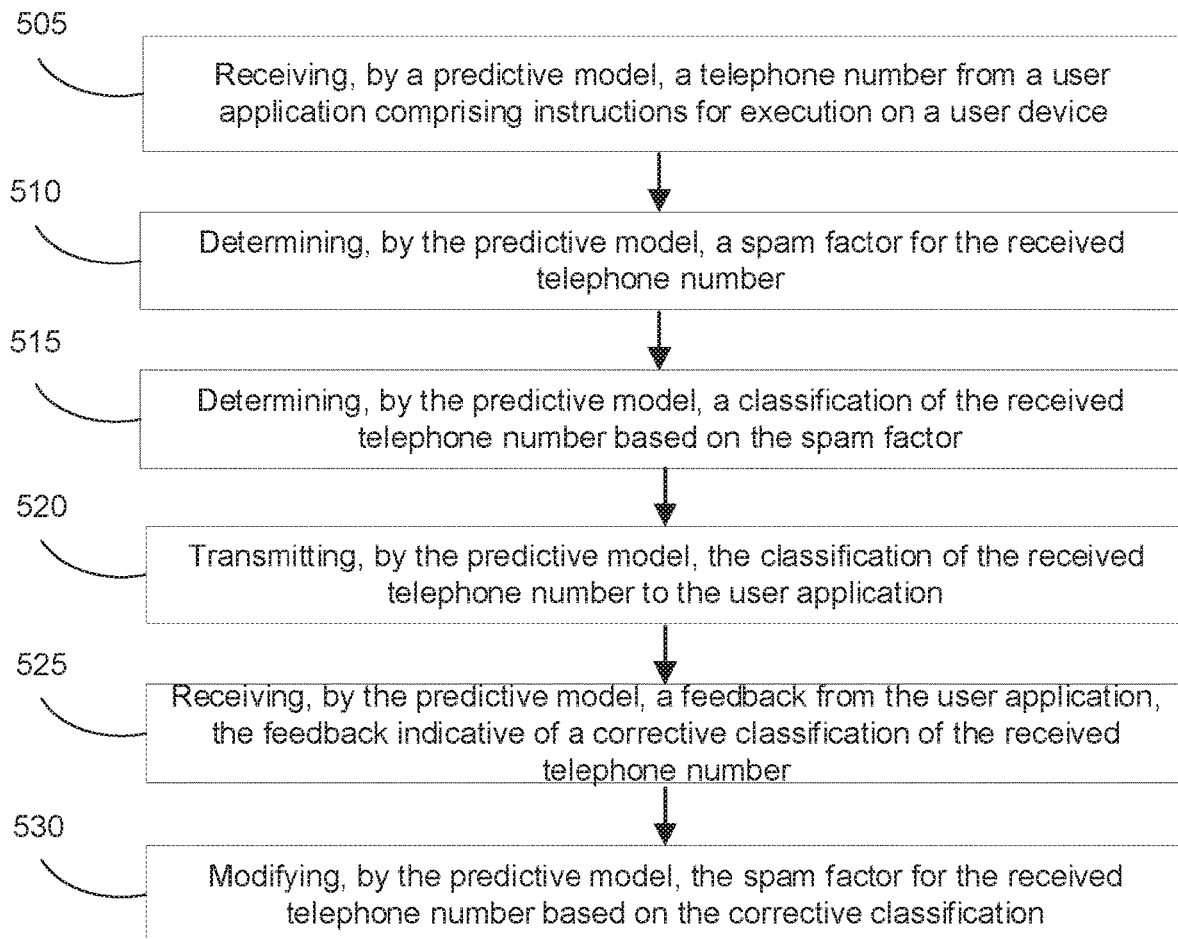
FIG. 5 is a flow chart illustrating a method of telephone call regulation according to an example embodiment.

FIG. 5 is a flow chart illustrating a method 500 of regulating a telephone call according to an example embodiment. FIG. 5 may reference the same or similar components as those illustrated in FIGS. 1-4, including a user device, a call device, a server, a database, and a network. The method 5 may be implemented by the server.

The method 500 may commence at block 505, where the predictive model of the server may receive a telephone number from the user application on the user device. For example, the call device may place a call using the telephone number to the user device, and the user device may then forward the telephone number to the server.

In block 510, the predictive model may determine a spam factor for the received telephone number. As discussed herein, the predictive model may utilize machine learning to determine the spam factor for the received telephone number, which will be described in detail in FIGS. 6 and 7. The spam factor can take various forms as described above.

In block 515, the predictive model may determine a classification of the received telephone number based on the spam factor. As described above, the classification may include "definitely spam", "likely spam", "likely not spam", and "verified phone number".

In block 520, the predictive mode may transmit the classification of the received telephone number to the user application of the user device. The transmission of the classification may be performed via a back channel of the network 150 between the server and the user device.

In block 525, the predictive model may receive a feedback from the user application. The feedback may be indicative of a corrective classification of the received telephone number. After an action executed by the user on the telephone call, the predictive model may be configured to generate a survey message for the received telephone number and transmit the survey message as a push notification to the user application. The survey message may include questions for the user regarding the telephone call, for example, whether the telephone call is actually a spam telephone number. The survey message may also include questions about the user's preferences, for example, whether the user prefers the telephone call at a certain time of day. The feedback may include answers to the questions as a response to the survey message.

In block 530, the predictive model may modify the spam factor for the received telephone number based on the feedback. The predictive model may use the feedback as a user input to further modify the spam factor. For example, in the case where the feedback is indicative of the corrective classification, the previous spam factor may indicate that the telephone number can be classified as "likely spam", and the telephone number is then verified by the user through the feedback as a spam phone number, the predictive model can utilize the corrective classification to modify the previous spam factor of the telephone number, such that the telephone number can now be classified as "definitely spam" based on the modified spam factor. The predictive model may be further configured to store the modified spam factor and the new classification of the telephone number in the database to replace the previous spam factor and the previous classification of the telephone number.

Figure 6:
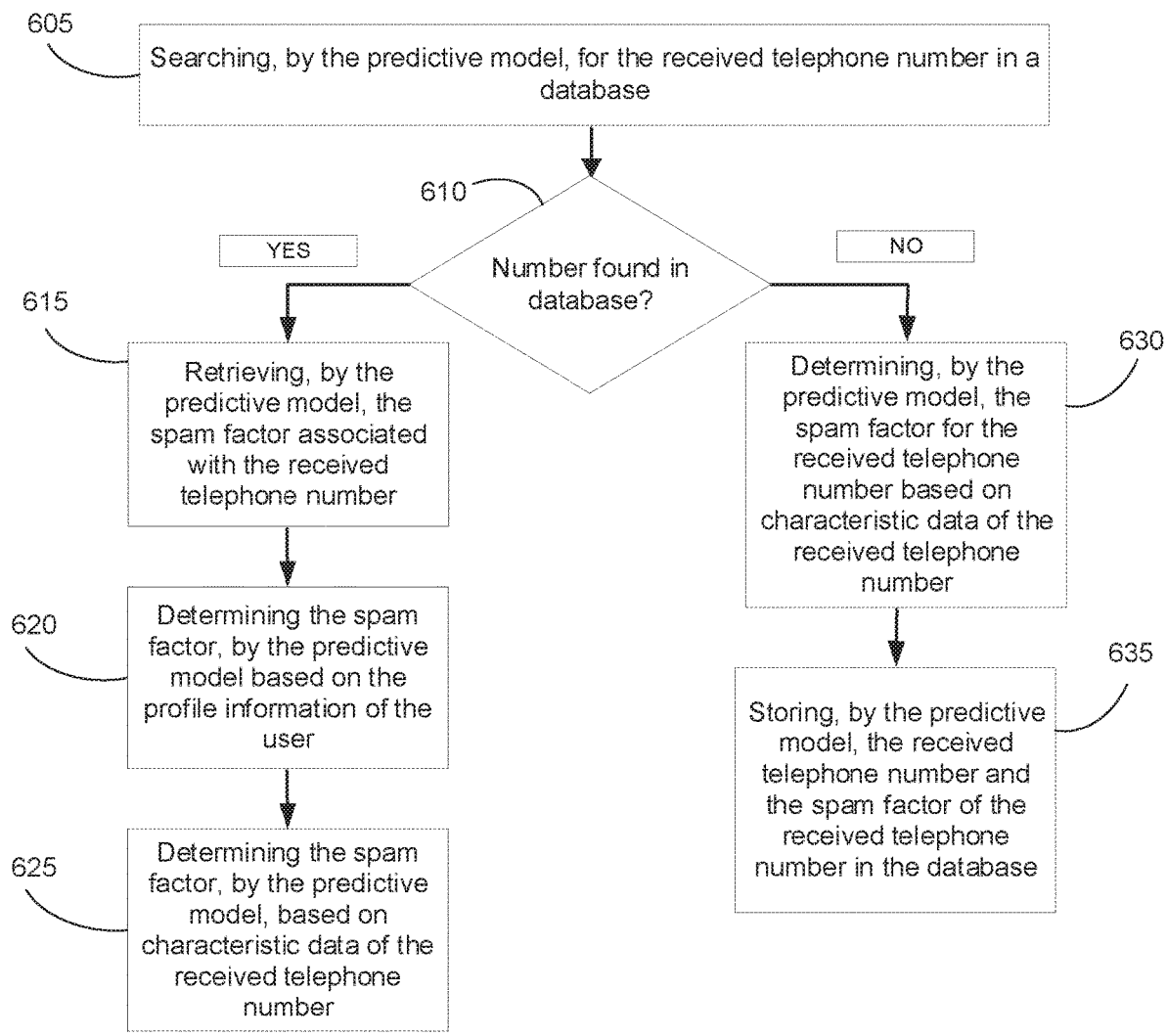
FIG. 6 is a flow chart illustrating a method of determining a spam factor for a telephone call number according to an example embodiment.

FIG. 6 is a flow chart illustrating a method 600 of determining a spam factor for a telephone call number according to an example embodiment. FIG. 6 may reference the same or similar components as those illustrated in FIGS. 1-5, including a user device, a call device, a server, a database, and a network. The method 600 may be implemented in the step 510 in FIG. 5.

The method 600 may commence at block 605, where the predictive model may search the database for the received telephone number. The database may contain a plurality of telephone numbers and a plurality of spam factors. Each spam factor is associated with one of the plurality of telephone numbers. The database may also contain a plurality of classifications respectively associated with the plurality of telephone numbers. Upon receiving the telephone number forwarded from the user device, the predictive model of the server may search the telephone number in the database to determine whether the telephone number is in the database.

In block 610, if the telephone number is determined to be in the database, that is, match one of the plurality of telephone numbers in the database, the option "YES" is determined and the method 600 proceeds to block 615 where the predictive model retrieves from the plurality of spam factors the spam factor associated with the received telephone number.

In an example embodiment, in block 620, the predictive may further determine the spam factor, for example, to update the retrieved spam factor, based on the profile information of the user associated with the user device. In this example embodiment, the database may further contain the profile information of the user associated with the user device. The user profile information may include, but not limited to: whether or not the user prefers a phone call, whether or not the user prefers a text message, whether or not the user prefers blocking calls from telemarketers, whether or not the user prefers allowing calls from doctors, whether or not the user prefers allowing calls from family members and friends, whether or not the user prefers allowing calls from schools, whether or not the user prefers blocking calls during a certain time range of daytime and nighttime, and so forth.

Depending on user profile information, a telephone number may be classified into different categories for different users. For example, a telephone number may be classified as "highly likely spam" for a user, but may also be classified as "less likely spam" for another user. That is, the spam factor and corresponding classification can be personalized. For example, a telephone number associated with a doctor's office may be assigned a spam factor in the database that classifies the telephone number from the doctor's office as a spam phone number for a first user according to the first user's profile information (e.g., the first user considers this telephone number as spam for him/her). However, the user profile information of a second user may indicate the allowance of such a call from the doctor's office. When a telephone call of the same telephone number is received by the second user from the doctor's office, the predictive model may infer from the user profile information of the second user to modify the retrieved spam factor. That is, the predictive model may change the retrieved spam factor indicative of being as "spam" to a spam factor indicative of being as "verified legitimate number" for the second user. Accordingly, the same telephone number is classified as a verified phone number for the second user and allowed to go through the second user's device.

In another example, the spam factor may be associated with user's preferences included in the user profile information. For example, a user may indicate in the user's preferences that any call after 10:00 PM will be spam for him/her. In this example, a telephone number may be assigned a spam factor in the database that classifies the telephone number as "verified phone number" for a user. When a telephone call of the telephone number is received by the user after 10:00 PM, the predictive model may infer from the user profile information of the user to modify the retrieved spam factor. That is, the predictive model may change the retrieved spam factor indicative of being as "verified phone number" to a spam factor indicative of being as "spam" for that user. Accordingly, the same telephone number is classified as spam for the user after 10:00 PM and blocked by the server after 10:00 PM for the user.

In an example embodiment, in block 625, the predictive may further determine the spam factor, for example, to update the retrieved spam factor, based on the characteristic data of the received telephone number. In this example embodiment, the database may further contain characteristic data of each of the plurality of telephone numbers. The characteristic data may include, but not limited to: an area code of each telephone number, call times for each telephone number, dates on which calls from each telephone number are received, whether each telephone number is a private number, whether each telephone number is a toll free number, the number of blocked calls for each telephone number, the number of answered calls for each telephone number, the frequency of calls for each telephone number during a certain period of time, whether each telephone number is on a do-not-call list, whether more calls than text messages from each telephone number are received, ring duration for each call from each telephone number, call durations of each telephone number if being answered, and so forth.

For example, when a telephone number is received, the predictive model may infer from the characteristic data of the received telephone number the frequency of blocked calls or allowed calls for the received telephone number. If the frequency of blocked calls is equal to or greater than a frequency threshold, the predictive model may modify the retrieved spam factor. That is, the predictive model may change the retrieved spam factor indicative of being as "less likely spam" to a spam factor indicative of being as "highly likely spam" for the received telephone number.

If the telephone number is determined not to be in the database, that is, a new telephone number, the option "NO" is determined and the method 600 proceeds to block 630 where the predictive model determines the spam factor for the received telephone number based on characteristic data of the received telephone number. The characteristic data of the received telephone number (i.e., a new telephone number) may include, but not limited to: an area code of the received telephone number, a time at which the telephone number is received, a date on which the telephone number is received, whether the received telephone number is a private number, whether the received telephone number is a toll free number, and so forth.

For example, if the received telephone number indicates that it is a toll free number, the predictive model may determine the spam factor indicative of being as "likely spam". A push notification may be transmitted by the server to the user device to notify the user of such classification, based on which the user may execute an action of either declining the call or accepting the call.

In this example embodiment, in block 635, the predictive model may store the received telephone number (a new telephone number) and the spam factor (a new spam factor) of the received telephone number in the database. The predictive model may further store the above characteristic data of this new telephone number in the database.

Figure 7:
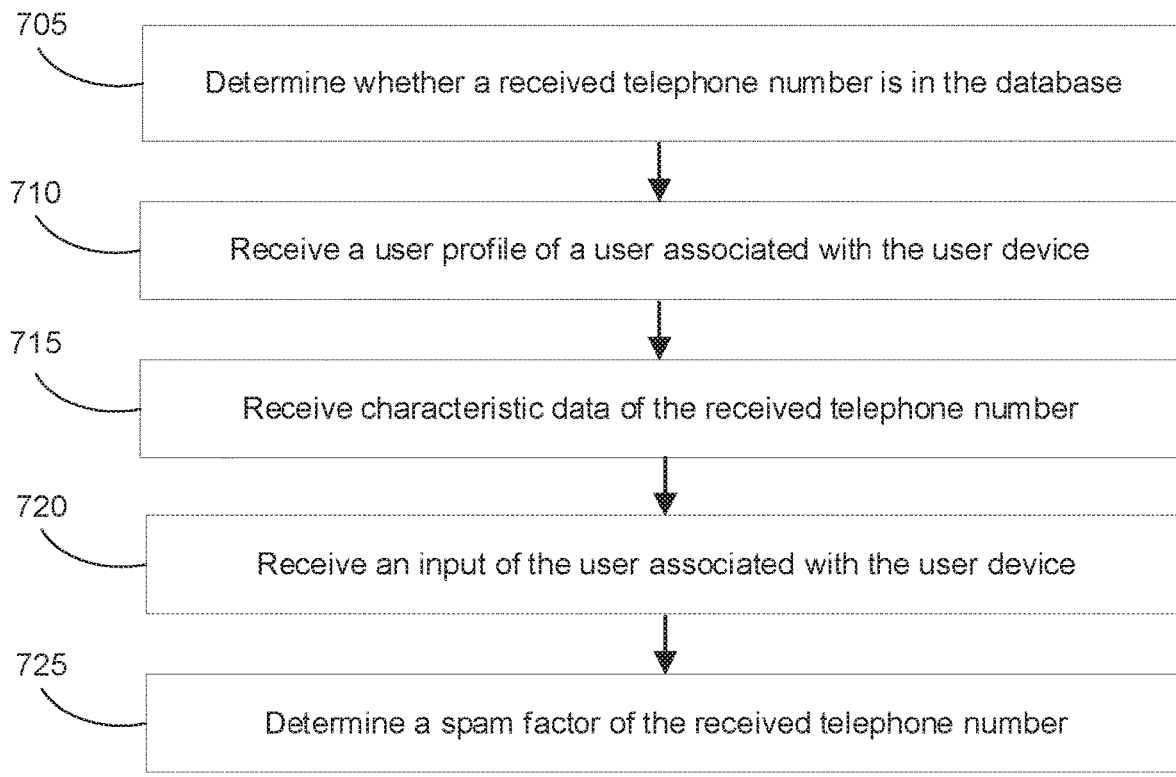
FIG. 7 is a flow chart illustrating a process of determining a spam factor by a predictive model for a telephone call number according to an example embodiment.

FIG. 7 is a flow chart illustrating a method 700 of determining a spam factor for a telephone call number according to an example embodiment. FIG. 7 may reference the same or similar components as those illustrated in FIGS. 1-6, including a user device, a call device, a server, a database, and a network. The method 700 may be implemented by the predictive model of the server based on various factors, and may be implemented in FIGS. 5 and 6.

As described herein, the predictive model may comprises various ML models, which take the various factors as inputs (e.g., user inputs/feedback, user profile information, and characteristic data of telephone numbers). The various ML models can utilize information from those inputs to determine a spam factor of a telephone number. The various ML models may comprise supervised learning (e.g., classification and regression), unsupervised learning (e.g., pattern recolonization and cluster analysis), semi-supervised learning, reinforcement learning, self-learning, feature learning (e.g., sparse dictionary learning), associate rules and anomaly detection. The various ML models can utilize various neural network, such as convolutional neural networks ("CNN") or recurrent neural networks ("RNN"). A CNN can include one or more convolutional layers (e.g., often with a subsampling step) and then followed by one or more fully connected layers as in a standard multilayer neural network. CNNS can utilize local connections, and can have tied weights followed by some form of pooling which can result in translation invariant features.

A RNN is a class of artificial neural network where connections between nodes form a directed graph along a sequence. This facilitates the determination of temporal dynamic behavior for a time sequence. Unlike feedforward neural networks, RNNs can use their internal state (e.g., memory) to process sequences of inputs. A RNN can generally refer to two broad classes of networks with a similar general structure, where one is finite impulse and the other is infinite impulse. Both classes of networks exhibit temporal dynamic behavior. A finite impulse recurrent network can be, or can include, a directed acyclic graph that can be unrolled and replaced with a strictly feedforward neural network, while an infinite impulse recurrent network can be, or can include, a directed cyclic graph that may not be unrolled. Both finite impulse and infinite impulse recurrent networks can have additional stored state, and the storage can be under the direct control of the neural network. The storage can also be replaced by another network or graph, which can incorporate time delays or can have feedback loops. Such controlled states can be referred to as gated state or gated memory, and can be part of long short-term memory networks ("LSTMs") and gated recurrent units.

RNNs can be similar to a network of neuron-like nodes organized into successive "layers," each node in a given layer being connected with a directed e.g., (one-way) connection to every other node in the next successive layer. Each node (e.g., neuron) can have a time-varying real-valued activation. Each connection (e.g., synapse) can have a modifiable real-valued weight. Nodes can either be (i) input nodes (e.g., receiving data from outside the network), (ii) output nodes (e.g., yielding results), or (iii) hidden nodes (e.g., that can modify the data en route from input to output). RNNs can accept an input vector x and give an output vector y. However, the output vectors are based not only by the input just provided in, but also on the entire history of inputs that have been provided in in the past.

Pattern recognition may be used to analyze and classify telephone call patterns, such as the number of answered calls and the number of declined calls. As used herein, the pattern recognition may refer to the automated recognition of patterns and regularities in the call data. Pattern recognition systems may be trained from labeled "training" data (supervised learning), but when no labeled data are available other algorithms can be used to discover previously unknown patterns. Pattern recognition is the assignment of a label to a given input value. In an example of pattern recognition, a telephone number may be assigned a spam factor based on comparisons between the number of answered calls and the number of declined calls.

For supervised learning in discrete time settings, sequences of real-valued input vectors can arrive at the input nodes, one vector at a time. At any given time step, each non-input unit can compute its current activation (e.g., result) as a nonlinear function of the weighted sum of the activations of all units that connect to it. Supervisor-given target activations can be supplied for some output units at certain time steps. In reinforcement learning settings, no teacher provides target signals. Instead, a fitness function, or reward function, can be used to evaluate the RNNs performance, which can influence its input stream through output units connected to actuators that can affect the environment. Each sequence can produce an error as the sum of the deviations of all target signals from the corresponding activations computed by the network. For a training set of numerous sequences, the total error can be the sum of the errors of all individual sequences.

The above described ML models can receive as inputs the parameters in FIG. 7 to determine a spam factor for a telephone number. In this exemplary embodiment, the method 700 may commence at block 705 where the predictive model receives a telephone number from the user device, may determine whether the received telephone number is in the database, as described above.

In block 710, the predictive model may receive a user profile of a user associated with the user device. Some details of the user profile information may be referred to above. The user profile may also include information indicating that the user will consider a telephone call as "spam" if the user is in the middle of something when the telephone call is incoming on the user device. In such scenario, the predictive model may also be configured to access the user's calendar information (e.g., stored in the application 113 of the user device 110). For example, if the user's calendar indicates that the user is in the middle of something (e.g., a meeting, a job interview, and the like) when the telephone call is being received by the user device, the predictive model may determine the spam factor indicative of being as "spam" for the telephone call and automatically block the telephone call. The server may also send a notification to the user device saying, for example, "we detect that you are in a meeting, and we have blocked this call at this time, although this may be a legitimate call at other times."

The user profile may also include a trend or pattern of how the user blocks or allows a telephone number. For example, if the user turns down calls from the telephone number more than allows calls from the telephone number in the past, the predictive model may determine the spam factor indicative of being "likely spam" for the telephone call.

In block 715, the predictive model may receive characteristic data of the received telephone number. Some details of the character data of a telephone number may be referred to above. The characteristic data may also include a call pattern. For example, families or friends or people with close relationships would call each other frequently. In other examples, the user may try to meet someone at a location, or the user is planning something with someone, and in these situations the user may receive a flurry of calls from a same telephone number. Such particular call pattern may be utilized by the predictive model to determine the spam factor for the telephone call. For example, a user may call a family member a lot at a given time, but the user can be determined by the predictive model as not a spammer. In this aspect, the predictive model may not only assess the frequency of calls, but also the number of the telephone number being called. A spammer would place a lot of calls to a large number of telephone numbers in a period of time. Whereas, a legitimate user is more likely to call a specific small set of people a lot. In another example, if a legitimate user may be assigned by a telephone company a previously used spam telephone number, the predictive model can be configured to catch such change to switch the telephone number from being classified as "spam" to as "verified legitimate number", for example, by ML pattern recognition. In another example, if a spammer starts using a verified legitimate telephone number, the predictive model can be configured to catch such change to switch the telephone number from being classified as "verified legitimate number" to as "spam", for example, by using user inputs/feedback. In block 720, the predictive model may receive an input of the user associated with the user device. Some details of user input may be referred to above. In an example, the predictive model may be configured to detect the user's action on the telephone call and use the action as an input to further tune the spam factor for the telephone number. The action may include answering the telephone call, declining the telephone call manually, keeping the telephone call ring for a certain period of time, and so forth. In another example, the user may provide his/her preference as an input to the predictive model. For example, a telephone number may be classified as a verified legitimate number previously for the user, and the predictive model notifies the user of the call being verified based on the previous classification when the call is received by the user device. However, the user may be in the middle of an activity when the call is received, so the user may provide his input to the predictive model, for example, saying "block this call during this activity in the future."

In block 725, the predictive model may use the above variables or parameters as inputs to determine the spam factor for the telephone number, and store the determined spam factor or update a previous spam factor with the determined spam factor in the database. Various machine learning techniques as describe above may be employed by the predictive model, including, but no limited to, gradient boosting machine, logistic regression, neural networks, decision trees, classification, and so forth.

Figure 8:
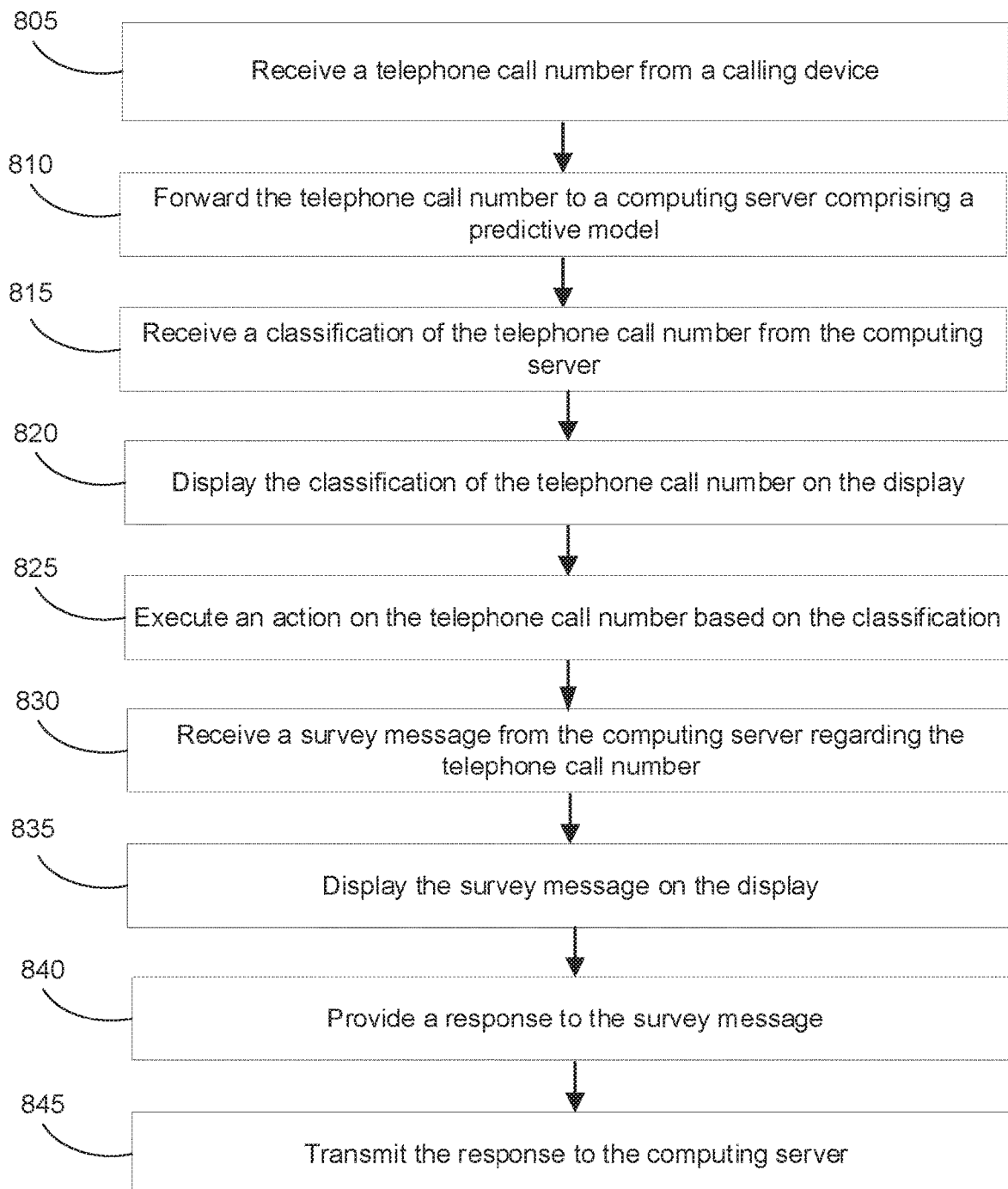
FIG. 8 is a flow chart illustrating a method of telephone call regulation according to an example embodiment.

FIG. 8 is a flow chart illustrating a method 800 of regulating a telephone call number according to an example embodiment. FIG. 8 may reference the same or similar components as those illustrated in FIGS. 1-7, including a user device, a call device, a server, a database, and a network. The method 800 may be implemented by the user device. Some details may be referred back to the above description, and will not repeated herein.

In block 805, the user device may receive a telephone call from a call device. In block 810, the user device may forward the telephone call to the server comprising the predictive model. After a spam factor is determined by the predictive model for the telephone call and the telephone call is classified based on the spam factor, in block 815, the user device receives the classification of the telephone call number from the server. In block 820, the user device may display the classification of the telephone call number on the display 114 of the user device. In block 825, the user may execute an action on the telephone call number based on the classification, for example, answering the telephone call or declining the telephone call. After the action, the server may generate and transmit a survey message to the user device. In block 830, the user device receives the survey message from the server regarding the telephone call number. In block 835, the user device may display the survey message on the display 114 of the user device. In block 840, the user may provide a response to the survey message. In block 845, the user device may transmit the response to the server. The predictive model may further tune the spam factor of the telephone number based on the response to the survey message.

In some embodiments, the predictive model may be configured to generate a telephone number list from the plurality of telephone numbers. Each telephone number on the telephone number list has a spam factor greater than a spam factor threshold (e.g., 0.9 on a 0-1 scale). That is, each telephone number on the telephone number list is classified at least as "highly likely spam". Such telephone number list can be downloadable to the user device via the application 113 of the user device. The user device can use this telephone number list as a quick lookup table for determining whether a telephone number is spam before forwarding the telephone number to the server for further processing. In such way, not only can the received telephone number be identified quickly but also reduce the computing and communications resource consumptions for both the user device and the server.

Once the telephone number list being generated, the server may transmit the telephone number list to the user application, or the user device may download the telephone number list from the server. The telephone number list may further include corresponding spam factors and classifications associated with the telephone numbers on the telephone number list. The user device may store the plurality of telephone numbers on the telephone number list in the memory 112 of the user device.

When the device receives a telephone call, the device may first search the plurality of telephone numbers on the telephone number list for the received telephone call number before forwarding the received telephone call number to the server. Upon locating the received telephone call number in the plurality of telephone numbers, the device may retrieve a spam factor associated with the received telephone call number from the plurality of spam factors, and execute an action based on the retrieved spam factor. The user device may be configured to modify via the user application 113 the retrieved spam factor after the action, and transmit the modified spam factor to the server. Accordingly, upon receiving the modified spam factor, the server may update a previous spam factor of the telephone number with the modified spam factor.

Upon not locating the received telephone call number in the plurality of telephone numbers on the telephone number list, the user device may determine via the application 113 a new spam factor of the received telephone call number based on characteristic data of the received telephone call number, and add the received telephone call number and the new spam factor of the received telephone call number to the plurality of telephone numbers and the plurality of spam factors, respectively on the telephone number list. Further, the new spam factor and the received telephone number may be transmitted to the server and stored in the database where the new spam factor may be further modified based on the user profile information. The user device may execute the action based on the new spam factor.

In some embodiments, the predictive model may be configured to update the plurality of phone numbers on the telephone number list, for example, to remove some telephone numbers that are not hit often when the user device searches the list and to add some telephone numbers whose spam factors are greater than the spam factor threshold. The update criteria may be based on: first in first out (FIFO), last in first out (LIFO), and least recently used (LRU).

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A telephone call regulation system, comprising:
    a database containing a plurality of telephone numbers and a plurality of spam factors, and each spam factor is associated with one of the plurality of telephone numbers; and
    a predictive model configured to:
        receive a telephone number from a user application comprising instructions for execution on a user device;
        determine a spam factor for the received telephone number;
        determine a classification of the received telephone number based on the spam factor;
        transmit the classification of the received telephone number to the user application;
        receive a feedback from the user application, the feedback indicative of a corrective classification of the received telephone number; and
        modify the spam factor associated with the received telephone number based on the corrective classification,
    wherein, upon determining the spam factor for the received telephone number, the predictive model is further configured to:
        search for the received telephone number in the plurality of telephone numbers in the database, and
        upon locating the received telephone number in the database, retrieve the spam factor associated with the received telephone number.

2. The telephone call regulation system of claim 1, wherein:
    the database further comprises profile information of a user associated with the user device, the profile information comprising one or more selected from the group of: whether or not the user prefers a phone call, whether or not the user prefers a text message, whether or not the user prefers blocking calls from telemarketers, whether or not the user prefers allowing calls from doctors, whether or not the user prefers allowing calls from family members and friends, whether or not the user prefers allowing calls from schools, and whether or not the user prefers blocking calls during a certain time range of daytime and nighttime; and
    the spam factor associated with the received telephone number is further determined by the predictive model based on the profile information of the user.

3. The telephone call regulation system of claim 1, wherein:
    the database further comprises characteristic data of each of the plurality of telephone numbers, the characteristic data comprising one or more selected from the group of: an area code of each telephone number, call times for each telephone number, dates on which calls from each telephone number are received, whether each telephone number is a private number, whether each telephone number is a toll free number, the number of blocked calls for each telephone number, the number of answered calls for each telephone number, the frequency of calls for each telephone number during a certain period of time, whether each telephone number is on a do-not-call list, whether more calls than text messages from each telephone number are received, ring duration for each call from each telephone number, and call durations of each telephone number if being answered; and
    the spam factor for the received telephone number is further determined by the predictive model based on characteristic data of the received telephone number.

4. The telephone call regulation system of claim 1, wherein upon not locating the received telephone number in the plurality of telephone numbers, the predictive model is further configured to:
    determine the spam factor for the received telephone number based on characteristic data of the received telephone number; and
    store the received telephone number and the spam factor of the received telephone number in the database,
    wherein the characteristic data of the received telephone number comprises one or more selected from the group of: an area code of the received telephone number, a time at which the telephone number is received, a date on which the telephone number is received, whether the received telephone number is a private number, and whether the received telephone number is a toll free number.

5. The telephone call regulation system of claim 1, wherein the classification of the telephone number comprises at least one selected from the group of definitely spam, likely spam, likely not spam, and verified phone number.

6. The telephone call regulation system of claim 1, wherein the predictive model is further configured to:
    generate a survey message for the received telephone number; and
    transmit the survey message to the user application,
    wherein the feedback is a response to the survey message.

7. The telephone call regulation system of claim 1, wherein upon modifying the spam factor associated with the received telephone number based on the corrective classification, the predictive model is further configured to store the modified spam factor in the database.

8. The telephone call regulation system of claim 1, wherein the predictive model is further configured to:
generate a telephone number list from the plurality of telephone numbers, each telephone number on the telephone number list having a spam factor greater than a spam factor threshold; and
transmit the telephone number list to the user application.

9. A telephone call regulation method, comprising:
receiving, by a predictive model, a telephone number from a user application comprising instructions for execution on a user device;
determining, by the predictive model, a spam factor for the received telephone number;
determining, by the predictive model, a classification of the received telephone number based on the spam factor;
transmitting, by the predictive model, the classification of the received telephone number to the user application;
receiving, by the predictive model, a feedback from the user application, the feedback indicative of a corrective classification of the received telephone number; and
modifying, by the predictive model, the spam factor for the received telephone number based on the corrective classification,
wherein upon determining the spam factor for the received telephone number, the method further comprising:
searching, by the predictive model, for the received telephone number in a database, wherein the database contains a plurality of telephone numbers and a plurality of spam factors, and each spam factor is associated with one of the plurality of telephone number; and
upon locating the received telephone number in the plurality of telephone numbers, retrieving, by the predictive model, the spam factor associated with the received telephone number.

10. The telephone call regulation method of claim 9, wherein:
the database further comprises profile information of a user associated with the user device, the profile information comprising one or more selected from the group of: whether or not the user prefers a phone call, whether or not the user prefers a text message, whether or not the user prefers blocking calls from telemarketers, whether or not the user prefers allowing calls from doctors, whether or not the user prefers allowing calls from family members and friends, whether or not the user prefers allowing calls from schools, and whether or not the user prefers blocking calls during a certain time range of daytime and nighttime; and
the spam factor for the received telephone number is further determined by the predictive model based on the profile information of the user.

11. The telephone call regulation method of claim 9, wherein:
the database further comprises characteristic data of each of the plurality of telephone numbers, the characteristic data comprising one or more selected from the group of: an area code of each telephone number, call times for each telephone number, dates on which calls from each telephone number are received, whether each telephone number is a private number, whether each telephone number is a toll free number, the number of blocked calls for each telephone number, the number of answered calls for each telephone number, the frequency of calls for each telephone number during a certain period of time, whether each telephone number is on a do-not-call list, whether more calls than text messages from each telephone number are received, ring duration for each call from each telephone number, and call durations of each telephone number if being answered; and
the spam factor for the received telephone number is further determined by the predictive model based on characteristic data of the received telephone number.

12. The telephone call regulation method of claim 9, wherein upon not locating the received telephone number in the plurality of telephone numbers, the method further comprising:
determining, by the predictive model, the spam factor for the received telephone number based on characteristic data of the received telephone number; and
storing, by the predictive model, the received telephone number and the spam factor of the received telephone number in the database,
wherein the characteristic data of the received telephone number comprises one or more selected from the group of: an area code of the received telephone number, a time at which the telephone number is received, a date on which the telephone number is received, whether the received telephone number is a private number, and whether the received telephone number is a toll free number.

13. The telephone call regulation method of claim 9, the method further comprising:
generating, by the predictive model, a survey message for the received telephone number; and
transmitting, by the predictive model, the survey message to the user application,
wherein the feedback is based on the survey message.

14. The telephone call regulation method of claim 9, wherein upon modifying the spam factor associated with the received telephone number based on the corrective classification, the method further comprising storing, by the predictive model, the modified spam factor in a database.

15. The telephone call regulation method of claim 9, the method further comprising:
generating, by the predictive model, a telephone number list from the plurality of telephone numbers, each telephone number on the telephone number list having a spam factor greater than a spam factor threshold; and
transmitting, by the predictive model, the telephone number list to the user application.

16. A device comprising:
a processor;
a display coupled to the processor; and
a memory coupled to the processor;
wherein the processor is configured to:
receive a telephone call number from a call device;
forward the telephone call number to a server comprising a predictive model;
receive a classification of the telephone call number from the server;
display the classification of the telephone call number on the display;
execute an action on the telephone call number based on the classification;
receive a survey message from the server regarding the telephone call number;
display the survey message on the display;
provide a response to the survey message; and
transmit the response to the server.

17. The device of claim 16, wherein the processor is further configured to:

receive a plurality of telephone numbers from the server and a plurality of spam factors greater than a spam factor threshold, wherein each spam factor of the plurality of spam factors is associated with one of the plurality of telephone number;

store the plurality of telephone numbers in the memory; and search the plurality of telephone numbers for the received telephone call number before forwarding the received telephone call number to the server.

18. The device of claim 17, wherein the processor is further configured to:

upon locating the received telephone call number in the plurality of telephone numbers, retrieve a spam factor associated with the received telephone call number from the plurality of spam factors; and execute the action based on the retrieved spam factor.

19. The device of claim 18, wherein the processor is further configured to:

modify the retrieved spam factor after the action; and transmit the modified spam factor to the server.

20. The device of claim 17, wherein the processor is further configured to:

upon not locating the received telephone call number in the plurality of telephone numbers, determine a spam factor of the received telephone call number based on characteristic data of the received telephone call number;

add the received telephone call number and the spam factor of the received telephone call number to the plurality of telephone numbers and the plurality of spam factors, respectively;

execute the action based on the spam factor; and transmit the received telephone call number and the spam factor of the received telephone call number to the server.

* * * * *